United States Patent
Zhang et al.

(10) Patent No.: US 12,487,917 B2
(45) Date of Patent: Dec. 2, 2025

(54) VIDEO MEMORY ALLOCATION METHOD AND APPARATUS, AND MEDIUM AND ELECTRONIC DEVICE

(71) Applicant: BEIJING YOUZHUJU NETWORK TECHNOLOGY CO., LTD., Beijing (CN)

(72) Inventors: Ying Zhang, Beijing (CN); Zongqiang Zhang, Beijing (CN); Sikai Qi, Beijing (CN); Yang Zhang, Los Angeles, CA (US); Zherui Liu, Beijing (CN); Jian Wang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/725,463

(22) PCT Filed: Feb. 21, 2023

(86) PCT No.: PCT/CN2023/077468
§ 371 (c)(1),
(2) Date: Jun. 28, 2024

(87) PCT Pub. No.: WO2023/174013
PCT Pub. Date: Sep. 21, 2023

(65) Prior Publication Data
US 2025/0068555 A1    Feb. 27, 2025

(30) Foreign Application Priority Data

Mar. 15, 2022    (CN) .......................... 202210256037.5

(51) Int. Cl.
*G06F 12/00*    (2006.01)
*G06F 12/02*    (2006.01)

(52) U.S. Cl.
CPC .................................. *G06F 12/023* (2013.01)

(58) Field of Classification Search
None
See application file for complete search history.

(56) References Cited

U.S. PATENT DOCUMENTS

| 6,817,011 B1 | 11/2004 | Reynolds |
| 2004/0160449 A1* | 8/2004 | Gossalia ............... G06F 9/4843 345/568 |

(Continued)

FOREIGN PATENT DOCUMENTS

| CN | 110413408 A | 11/2019 |
| CN | 111078412 A | 4/2020 |

(Continued)

OTHER PUBLICATIONS

International Search Report received for PCT Patent Application No. PCT/CN2023/077468, mailed on May 19, 2023, 11 pages (3 pages of English Translation and 8 pages of Original Document).

(Continued)

*Primary Examiner* — Daniel D Tsui

(57) ABSTRACT

A video memory allocation method and apparatus, and a medium and an electronic device are provided. The method includes: determining a usage capacity of a physical video memory in response to receiving a first call request of an application program for a video memory allocation interface in a target video memory management link library; if a sum of the usage capacity and an applied capacity corresponding to the first call request is greater than a total capacity of the physical video memory, generating a second call request for calling a memory hosting interface according to the first call request, and calling the memory hosting interface based on (Continued)

the second call request; and obtaining a response of the first call request according to a calling result of the second call request.

20 Claims, 2 Drawing Sheets

(56) References Cited

U.S. PATENT DOCUMENTS

2019/0244096 A1* 8/2019 Lee ................. G06F 3/0604
2021/0072967 A1   3/2021 Lepera et al.

FOREIGN PATENT DOCUMENTS

| | | |
|---|---|---|
| CN | 111562988 A | 8/2020 |
| CN | 111737019 A | 10/2020 |
| CN | 112000463 A | 11/2020 |
| CN | 113835887 A | 12/2021 |
| CN | 114625536 A | 6/2022 |
| CN | 114625536 B | 10/2023 |

OTHER PUBLICATIONS

Notice of Allowance received from Chinese patent application No. 202210256037.5 mailed on Sep. 22, 2023, 6 pages (2 pages English Translation and 4 pages Original Copy).
Office action received from Chinese patent application No. 202210256037.5 mailed on Jul. 11, 2023, 13 pages (6 pages English Translation and 7 pages Original Copy).

* cited by examiner

US 12,487,917 B2

VIDEO MEMORY ALLOCATION METHOD AND APPARATUS, AND MEDIUM AND ELECTRONIC DEVICE

The present disclosure claims priority of the Patent Application No. 202210256037.5 filed on Mar. 15, 2022 to Chinese Patent Office and entitled "Video Memory Allocation Method, Apparatus, Medium and Electronic Device," the contents of which are incorporated herein by reference in its entirety to the present disclosure.

TECHNICAL FIELD

The present disclosure relates to the field of computer technologies, and in particular to a video memory allocation method and apparatus, a medium, an electronic device, a computer program, and a computer program product.

BACKGROUND

In a scenario of machine learning, a graphics processing unit (Graphics Processing Unit, abbreviated as GPU) is usually used in machine learning computing because of efficient parallel computing and thus great computational advantages for matrix multiplication and convolution. In machine learning, GPU cards are also used to accelerate GPU tasks, and an amount of video memories that can be used in the GPU tasks is usually limited by a physical video memory capacity of the GPU cards.

In machine learning, framework, such as a tensorflow/pytorch framework or a caffe/mxnet framework is often used to implement. In the above framework, an operation interface is provided to call the GPU to make an algorithm migrate to the GPU. However, an interface used when a video memory is applied in the operation interface provided in the above framework can only be used to apply for the video memory, resulting in a significant impact on computational efficiency and a use effect of machine learning due to the physical video memory capacity.

SUMMARY

This section is provided to introduce concepts in a brief form, which will be described in detail in the detailed description later. This section is not intended to identify key features or essential features of the claimed technical solutions, nor is it intended to limit the scope of the claimed technical solutions.

In a first aspect, the present disclosure provides a video memory allocation method, including:

determining a usage capacity of a physical video memory in response to receiving a first call request of an application program for a video memory allocation interface in a target video memory management link library;

if a sum of the usage capacity and an applied capacity corresponding to the first call request is greater than a total capacity of the physical video memory, generating a second call request for calling a memory hosting interface according to the first call request, and calling the memory hosting interface based on the second call request; and obtaining a response of the first call request according to a calling result of the second call request.

In a second aspect, the present disclosure provides a video memory allocation apparatus, including:

a first determining module, configured to determine a usage capacity of a physical video memory in response to receiving a first call request of an application program for a video memory allocation interface in a target video memory management link library;

a generation module, configured to: if a sum of the usage capacity and an applied capacity corresponding to the first call request is greater than a total capacity of the physical video memory, generate a second call request for calling a memory hosting interface according to the first call request, and calling the memory hosting interface based on the second call request; and a second determining module, configured to obtain a response of the first call request according to a calling result of the second call request.

In a third aspect, the present disclosure provides a computer-readable medium. The computer-readable medium stores a computer program thereon, and the steps of the method of the first aspect are implemented when the computer program is executed by a processing apparatus.

In a fourth aspect, the present disclosure provides an electronic device, including:

a storage apparatus storing at least one computer program thereon; and at least one processing apparatus, configured to execute the at least one computer program in the storage apparatus to implement the steps of the method of the first aspect.

In a fifth aspect, the present disclosure provides a computer program, including program codes executable by a processing apparatus. When the processing apparatus executes the computer program, the steps of the method of the first aspect are implemented.

In a sixth aspect, the present disclosure provides a computer program product, including a computer program carried on a non-transitory computer-readable medium. The computer program includes program codes executable by a processing apparatus, and when the processing apparatus executes the computer program, steps of the method of the first aspect are implemented.

In the above technical solutions, when receiving a video memory allocation application of an application, if it is difficult to meet the allocation application based on a current physical video memory, a memory can be dynamically applied based on a memory hosting interface, to respond to the video memory allocation application of the application program based on the memory. Therefore, based on the above technical solutions, when a video memory allocation interface is called to apply for a video memory, calling for the memory hosting interface can be automatically generated to respond to a video memory allocation request based on the memory, so that a limitation and an effect of a physical video memory capacity on efficiency and use of a machine learning model can be effectively reduced, and deployment and use scopes of the machine learning model can be broadened.

Other features and advantages of the present disclosure will be described in detail in the detailed description section that follows.

BRIEF DESCRIPTION OF THE DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and originals and elements may not necessarily be drawn to scale.

DETAILED DESCRIPTION

Figure 1:
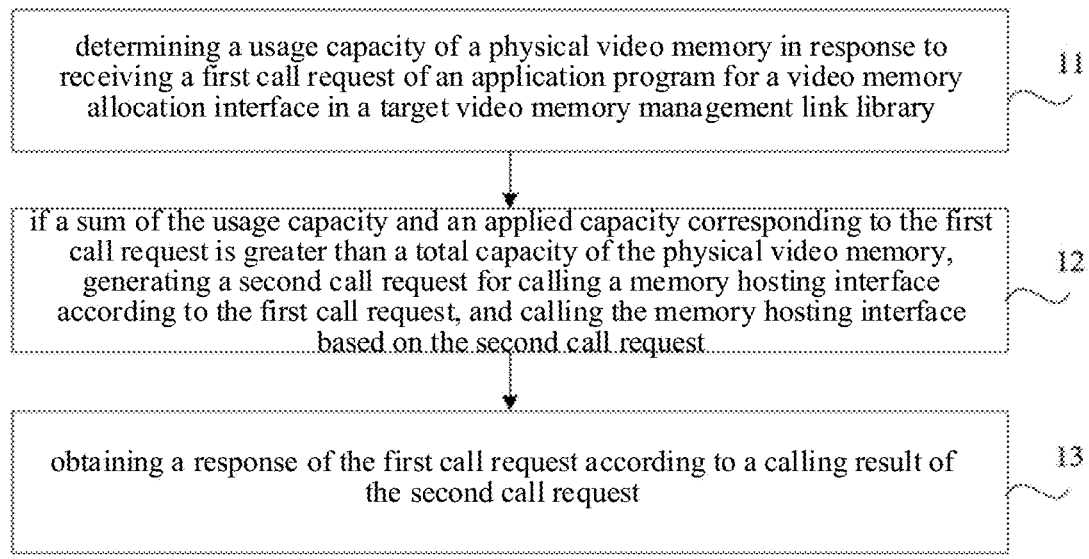
FIG. 1 is a flowchart of a video memory allocation method according to an embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more."

The names of messages or information exchanged between multiple devices in the implementation modes of the present disclosure are used for illustrative purposes only and are not used to restrict the scope of such messages or information.

All actions to obtain signals, information or data in the present disclosure are carried out under the premise of complying with the corresponding data protection regulations and policies of the host country and obtaining authorization from the corresponding device owner.

FIG. 1 is a flowchart of a video memory allocation method according to an embodiment of the present disclosure. As illustrated in FIG. 1, the method includes the following steps.

In step 11, determining a usage capacity of a physical video memory in response to receiving a first call request of an application program for a video memory allocation interface in a target video memory management link library.

As mentioned in the Background, in the framework such as a tensorflow/pytorch framework or a caffe/mxnet framework commonly used in machine learning, an interface provided when a video memory is applied can only be used to apply for the video memory, for example, a video memory allocation interface such as cudaMalloc, cudaMalloc_v2, cuMemAlloc, cuMemAlloc_v2, cuMemAllocPitch, cuMemAllocPitch_v2. In this embodiment, the application program may be an application program implemented based on a framework of machine learning. Based on this, in embodiments of the present disclosure, after receiving the first call request of the application program for such a video memory allocation interface, a current usage capacity of the physical video memory may be determined firstly, to determine whether the first call request can be responded based on the video memory allocation interface. The library provided by a graphics card includes an NVML library, and the usage capacity of the physical video memory may be queried based on a corresponding function in the NVML library, to determine whether video memory allocation can be implemented based on the physical video memory. The use of the NVML library is the prior art, which will not be described herein.

The target video memory management link library is a pre-developed link library to replace a native video memory management link library and implement management of a video memory. For example, hook codes may be injected into the application program, so that when it is detected that the application program calls the video memory allocation interface, a call request is intercepted and sent to the video memory allocation interface in the target video memory management link library. For another example, an interface provided by the target video memory management link library for outside may be set to be the same as an interface of the native video memory management link library, so that the call request initiated by the application program can be directly sent to a corresponding interface in the target video memory management link library.

In step 12, if a sum of the usage capacity and an applied capacity corresponding to the first call request is greater than a total capacity of the physical video memory, generating a second call request for calling a memory hosting interface according to the first call request, and calling the memory hosting interface based on the second call request.

For example, an example in which cuMemAlloc is a video memory allocation interface for calling is illustrated. The first call request may be expressed as follows:

CUresult cuMemAlloc(CUdeviceptr *dptr, size_t bytesize)

Here, bytesize represents the applied capacity corresponding to the first call request, and *dptr is used to return a pointer to an allocated video memory. The total capacity of the physical video memory may be obtained based on configuration information, and the usage capacity is a currently occupied capacity of the physical video memory. If the sum of the usage capacity and the applied capacity corresponding to the first call request is greater than the total capacity of the physical video memory, it indicates that a video memory with a size of bytesize cannot be allocated in response to the first call request based on the current physical video memory.

A computer unified device architecture (Computer Unified Device Architecture, abbreviated as CUDA) is a parallel computing framework for a GPU, and is an operation platform. An Nvidia GPU UM (Unified Memory) technology is provided in the CUDA to allow an application program to allocate a memory and a video memory by using a CUDA interface. In the CUDA, unified memory addressing is to unify a memory at a central processing unit (Central Processing Unit, abbreviated as CPU) end with a GPU video memory, and allocating a unified memory may return an access pointer from any processor, thus making it easy to traverse data that can be used by code run on any processor in the allocation system. For example, in the CUDA, the video memory and the memory may be allocated based on a function such as cudaMallocManaged or cuMemAllocManaged. Based on this, the memory hosting interface in this embodiment may be a native memory hosting interface provided in the CUDA, for example, cudaMallocManaged or cuMemAllocManaged, and a specific selected interface may be set in advance when the target video memory management link library is developed.

Accordingly, in this case, the second call request may be generated by the applied capacity corresponding to the first call request. For example, if the memory hosting interface may be a cudaMallocManaged function, the second call request for calling the cudaMallocManaged function may be further generated based on the applied capacity and a parameter type and quantity of the cudaMallocManaged function. For example, the second call request may be expressed as: cudaMallocManaged(void**dePtr,size_t bytesize). This function may allocate a hosting memory of bytesize bytes and return a pointer with devPtr, and the pointer is valid on all CPU devices and hosts, that is, unified memory management. Therefore, during video memory allocation, when a capacity of the physical video memory is insufficient to perform video memory allocation based on the first call request, an attempt may be made to apply for a memory to respond to the first call request.

In step 13, obtaining a response of the first call request according to a calling result of the second call request.

For example, a return value of the first call request may be generated based on a return value of the calling result of the second call request, to obtain the response of the first call request. As mentioned above, the pointer returned based on the second call request may be used as the response of the first call request to inform the application program of a video memory address allocated to the application program, so as to facilitate the application program to use the video memory applied by the application program.

Therefore, in the above technical solutions, when receiving a video memory allocation application of an application program, if it is difficult to meet the allocation application based on a current physical video memory, a memory can be dynamically applied based on a memory hosting interface, to respond to the video memory allocation application of the application program based on the memory. Therefore, based on the above technical solutions, when a video memory allocation interface is called to apply for a video memory, calling for the memory hosting interface can be automatically generated to respond to a video memory allocation request based on the memory; so that a limitation and an effect of a physical video memory capacity on efficiency and use of a machine learning model can be effectively reduced, and deployment and use scopes of the machine learning model can be broadened.

In one possible embodiment, the memory hosting interface is configured to dynamically apply for a memory to use the applied memory as a virtual video memory. An example implementation for calling the memory hosting interface based on the second call request is as follows, which step may include:

obtaining a capacity of the virtual video memory being applied, wherein an allocated virtual video memory capacity may be obtained through a native library function provided in the CUDA, which is not detailed here; and if the sum of the capacity of the virtual video memory being applied and the applied capacity is less than a target threshold, performing memory allocation based on the memory hosting interface and the applied capacity, wherein the target threshold is determined based on the total capacity of the physical video memory and a preset ratio, and the preset ratio is greater than 0 and less than 1.

The preset ratio may be pre-configured in the target video memory management link library, and a capacity of the memory for video memory over-allocation, namely, an available capacity of the virtual video memory, may be determined based on the preset ratio. For example, the total capacity of the physical video memory is 15 GiB, where GiB is Gibibyte (giga binary byte), and is a unit of information or computer hard disk storage, which is a binary capacity unit. The preset ratio can be set to 50%, then the target threshold is 7.5 GiB* (15 GiB*50%), and a total video memory capacity that can be allocated in a video memory management system is 22.5 GiB (15 GiB+15 GiB*50%). For another example, if the preset ratio is set to 100%, then the target threshold is 15 GiB, and the total video memory capacity that can be allocated in the video memory management system is 30 GiB (15 GiB+15 GiB*100%), so that the video memory capacity that can be allocated in the video memory management system can exceed a capacity of the physical video memory, and video memory over-allocation can be implemented.

In this embodiment, the sum of the capacity of the virtual video memory being applied and the applied capacity is less than the target threshold, which indicates that video memory allocation may be performed by applying for a memory as a virtual video memory at present. In this case, memory allocation may be performed based on the memory hosting interface and the applied capacity, that is, a memory with the applied capacity is allocated based on the memory hosting interface, and a pointer to the allocated memory is returned, to complete the application and allocation of the video memory of the application.

Therefore, through the technical solutions, the memory may be dynamically applied as the virtual video memory based on the memory hosting interface during allocating the video memory for the application program, so as to implement memory over-allocation, to provide a foundation for safe operation of the application, so that an upper limit of the video memory that can be used by the memory management system exceeds the capacity of the physical video memory, to provide technical support for improving execution efficiency of a GPU task, and meanwhile reduce hardware requirements of an execution device for task execution.

In a possible embodiment, the method may further include:

if a sum of the capacity of the memory being applied (namely, the capacity of the virtual video memory being applied) and the applied capacity is not less than the target threshold, determining that the calling result of the second call request is the video memory being not allocated; and outputting a prompt message, wherein the prompt message is used for prompting insufficient video memory allocation.

In this embodiment, if the sum of the capacity of the memory being applied and the applied capacity is not less than the target threshold, it indicates that it is also difficult for an over-allocation capacity of the video memory in the video memory management system to meet the capacity to be applied by the first call request. In this case, video memory will not be allocated, and it may be determined that the call result of the second call request is the video memory being not allocated. For example, the call result that the video memory is not allocated may be pre-set with a default identifier, so that when the identifier is obtained as the return value, it may be directly determined that the video memory is not allocated, and the return value may be further used as the response of the first call request.

Further, the prompt message may be output. The prompt message may be either output to a log file of the application or to a user through a pop-up window in the application program for prompting, so that the user can learn a running status of the application program in a timely manner and take timely response measures.

In one possible embodiment, the target video memory management link library may perform linking in the following manners:

renaming an initial name of a native video memory management link library in a video memory operation platform to obtain an updated link library.

The video memory operation platform may be a CUDA platform, and the initial name of the native video memory management link library may be libcuda.so, which may be pre-set according to a definition in the CUDA platform, and then the initial name may be renamed later. For example, the initial name may be renamed to libcuda.nvidia.so, that is, the native video memory management link library is renamed, to obtain an updated link library libcuda.nvidia.so.

Afterwards, the name of the target video memory management link library may be named as the initial name of the native video memory management link library, and the target video memory management link library may be connected to the video memory operation platform and a corresponding link address of the native video memory management link library. The link address may include various addresses that are used to call the native video memory management link library.

The target video memory management link library and the updated link library have one-to-one corresponding interfaces with the same name, implementation of the video memory allocation interface in the target video memory management link library is different from implementation of a video memory allocation interface in the updated link library, and implementation of an interface in the target video memory management link library other than the video memory allocation interface is calling for a corresponding interface with the same name in the updated link library.

In this embodiment, the native video memory management link library in the video memory operation platform may be directly replaced with a newly constructed target video memory management link library. For example, a name of the constructed target video memory management link library may be named libcuda.so. The target video memory management link library implements a same function interface as that in the native video memory management link library. It should be noted that for ease explanation, the target video memory management link library libcuda.so is indicated by libcuda.so(xcuda) hereinafter, to indicate that it is a target video memory management link library. This is only an example for illustration, and the name of the target video memory management link library in an application scenario is still the same as the initial name of the native link library.

When an application program accesses a GPU device, the access is usually performed by calling a CUDA programming library (for example, cudnn or cublas) or a nvml programming library. These programming libraries ultimately send an operation request to a GPU driver by calling a CUDA link library file (libcuda.so and its link file libcuda.so.1) or a nvml link library file (libnvidia-ml.so.1) to achieve GPU data access. Therefore, in this embodiment, connecting the target video memory management link library to the video memory operation platform may be softlinking the target video memory management link library libcuda.so(xcuda) to a relevant link library in the native CUDA and nvml, that is, softlinking the libcuda.so (xcuda) to a link address such as libcuda.so, libcuda.so.1, libnvidia-ml.so.1, so that when the application program calls a link library file in the CUDA and the nvml, the application program directly calls the target video memory management link library libcuda.so(xcuda) through a corresponding link address.

As mentioned above, the target video memory management link library and the updated link library have one-to-one corresponding interfaces with the same name, and implementation of the video memory allocation interface in the target video memory management link library is different from implementation of a video memory allocation interface in the updated link library. Therefore, when the video memory allocation interface in the target video memory management link library is called, the implementation of the video memory allocation interface in the target video memory management link library may be directly called. The implementation of the video memory allocation interface may be the operation of the video memory allocation method described above. However, when an interface in the target video memory management link library other than the video memory allocation interface is called, for example, when a cuLaunchKernel interface is called, implementation of the interface is to call a corresponding interface with the same name in the updated link library, that is, the call may be sent to the interface with the same name in the updated link library libcuda.nvidia.so, to implement calling for the interface. The calling order may be expressed as:

GPU->a cuLaunchKernel interface in libcuda.so (xcuda)->a cuLaunchKernel interface in libcuda.nvidia.so Therefore, based on the above technical solutions, it is capable to rename the native video memory management link library in the video memory operation platform, and connect the target video memory management link library to the video memory operation platform and the corresponding link address of the native video memory management link library, so that when the GPU calls the video memory management link library, the target video memory management link library may be automatically linked without modifying underlying video memory management code of an application program framework, and update adaption of video memory management may be implemented in a case that the application program is unaware, which improves user experience.

In one possible embodiment, the video memory allocation method is applied to a container, and the target video memory management link library is mounted in the container in the following manners:

storing the target video memory management link library and the updated link library at a target storage location of a host corresponding to the container; and upon the container being started, linking the target video memory management link library to a link address of a native video memory management link library corresponding to the container, and linking the updated link library to a target address in the container, wherein the target address is different from the link address.

The container may be a docker container, and kubernetes is a container cluster management system that can achieve automated deployment of a container cluster. In a kubernetes cluster, the docker container mounts and uses a GPU driver and libcuda.so link library file of the host machine. Therefore, when a kubernetes instance is created, it is necessary to map the target video memory management link library to a file path of the video memory management link library of the container, so that when an application program inside the container access the GPU by the video memory management link library, the interface content implemented in the target video memory management link library run.

For example, when a kubernetes instance is created, the target video memory management link library and the updated link library may be stored at the target storage location of the host corresponding to the container in the following manners:

volumes:
  name: xcuda-volume
    hostPath:
      path:/xcuda/libcuda.so
    type: File
  name: nvcuda-volume
    hostPath:
      path:/usr/lib/x86_64-linux-gnu/libcuda.so
    type: File Use of a volumes command may be implemented based on syntax of kubernetes, which will not be described herein again. By creating the above instances, the target video memory management link library may be defined as xcuda-volume, and stored in the target storage location/xcuda/libcuda.so in a file type of File; and the updated link library may be defined as nvcuda-volume, and stored in/usr/lib/x86_64-linux-gnu/libcuda.so in a file type of File.

Afterwards, the above two video memory management link library files may be respectively mounted to corresponding link addresses by configuring a mapping rule. Continuing to the previous example, the link address of the native video memory management link library may be an address such as libcuda.so, libcuda.so.1, libnvidia-ml.so.1. The mapping rule may be configured as follows:

volumeMounts:
  mountPath:/usr/lib/x86_64-linux-gnu/libcuda.so
    name: xcuda-volume
  mountPath:/usr/lib/x86_64-linux-gnu/libcuda.so.1
    name: xcuda-volume
  mountPath:/usr/lib/x86_64-linux-gnu/libnvidia-ml.so.1
    name: xcuda-volume
  mountPath:/usr/lib/x86_64-linux-gnu/libcuda.nvidia.so
    name: nvcuda-volume Therefore, according to the above rule, a file defined as xcuda-volume (namely, the target video memory management link library) may be linked to libcuda.so, libcuda.so.1, and libnvidia-ml.so.1, and a file defined as nvcuda-volume (namely, the updated link library) may be linked to libcuda.nvidia.so, which implements call adaptation of the GPU application program in the container.

For example, when an instance is created by using a docker command, a same file mapping rule may be specified, for example, a mapping rule may be implemented by using a -v command, for example, -v/xcuda/libcuda.so:/usr/lib/x86_64-linux-gnu/libcuda.so:ro That is, it indicates mounting a/xcuda/libcuda.so directory in the host machine to a/usr/lib/x86_64-linux-gnu/libcuda.so directory in the container, to implement mounting of the target video memory management link library in the container, so that an application program in the container can access the GPU based on the target video memory management link library.

Therefore, based on the above technical solutions, the target video memory management link library may be mounted to the corresponding container by configuring file mapping of the target video memory management link library on the host. Upon the container on the host being started, the target video memory management link library may automatically replace the native video memory management link library, which facilitates the adaptation of the video memory allocation method provided in the present disclosure to the container, to further broaden an application scope of the video memory allocation method in the present disclosure, reduce user configuration operations, and improve user experience.

In a possible embodiment, the method may further include:

if the sum of the usage capacity and the applied capacity corresponding to the first call request is not greater than the total capacity of the physical video memory, generating a third call request for calling the video memory allocation interface in the updated link library according to the first call request, and calling the video memory allocation interface in the updated link library based on the third call request; and obtaining the response of the first call request, according to a calling result of the third call request.

If the sum of the usage capacity and the applied capacity corresponding to the first call request is not greater than the total capacity of the physical video memory, it indicates that video memory allocation may be performed in response to the first call request based on the current physical video memory. In this embodiment, the third call request for calling a video memory allocation interface with the same name in the updated link library may be generated based on the first call request. Continuing to the above example, the first call request may be cuMemAlloc(CUdeviceptr*dptr, size_t bytesize), and in this case, a function with the same name in libcuda.nvidia.so in the updated link library may be called. That is, the third call request may be generated based on the above parameter to call a cuMemAlloc( ) function in libcuda.nvidia.so in the updated link library to allocate a video memory with a size of bytesize.

Therefore, based on the above technical solutions, when it is determined that video memory allocation may be implemented based on the physical video memory, a video memory allocation interface in the native video memory management link library may be directly called, so that a development workload of the target video memory management link library can be reduced while ensuring accuracy of video memory allocation.

Figure 2:
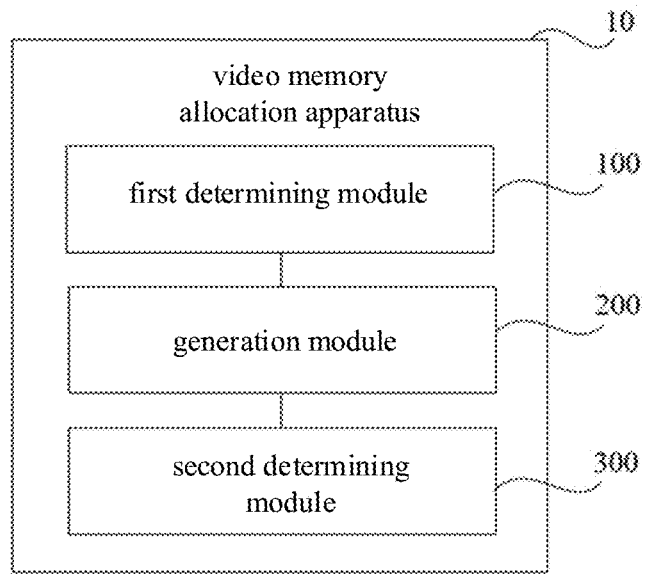
FIG. 2 is a block diagram of a video memory allocation apparatus according to an embodiment of the present disclosure.

The present disclosure further provides a video memory allocation apparatus, as illustrated in FIG. 2. The apparatus 10 includes:

a first determining module 100, configured to determine a usage capacity of a physical video memory in response to receiving a first call request of an application program for a video memory allocation interface in a target video memory management link library;

a generation module 200, configured to: if a sum of the usage capacity and an applied capacity corresponding to the first call request is greater than a total capacity of the physical video memory, generate a second call request for calling a memory hosting interface according to the first call request, and calling the memory hosting interface based on the second call request; and a second determining module 300, configured to obtain a response of the first call request according to a calling result of the second call request.

Optionally, the memory hosting interface is configured to dynamically apply for a memory to use the applied memory as a virtual video memory. The generation module includes:

an obtaining sub-module, configured to obtain a capacity of the virtual video memory being applied; and an allocation sub-module, configured to: if the sum of the capacity of the virtual video memory being applied and the applied capacity is less than a target threshold, perform memory allocation based on the memory hosting interface and the applied capacity, wherein the target threshold is determined based on the total capacity of the physical video memory and a preset ratio, and the preset ratio is greater than 0 and less than 1.

Optionally, the apparatus further includes:

a third determining module, configured to: if a sum of a capacity of the memory being applied (namely, the capacity of the virtual video memory being applied) and the applied capacity is not less than the target threshold, determine that the calling result of the second call request is the video memory being not allocated; and an output module, configured to output a prompt message, wherein the prompt message is used for prompting insufficient video memory allocation.

Optionally, the target video memory management link library performs linking in the following manners:

renaming an initial name of a native video memory management link library in a video memory operation platform to obtain an updated link library; and naming a name of the target video memory management link library as the initial name of the native video memory management link library, and connecting the target video memory management link library to the video memory operation platform and a link address corresponding to the native video memory management link library, wherein the target video memory management link library and the updated link library have one-to-one corresponding interfaces with the same name, implementation of the video memory allocation interface in the target video memory management link library is different from implementation of a video memory allocation interface in the updated link library, and implementation of an interface in the target video memory management link library other than the video memory allocation interface is calling for a corresponding interface with the same name in the updated link library.

Optionally, the video memory allocation method is applied to a container, and the target video memory management link library is mounted in the container in the following manners:

storing the target video memory management link library and the updated link library at a target storage location of a host corresponding to the container; and upon the container being started, linking the target video memory management link library to a link address of a native video memory management link library corresponding to the container, and linking the updated link library to a target address in the container, wherein the target address is different from the link address.

Optionally, the apparatus further includes:

a processing module, configured to: if the sum of the usage capacity and the applied capacity corresponding to the first call request is not greater than the total capacity of the physical video memory, generating a third call request for calling the video memory allocation interface in the updated link library according to the first call request, and calling the video memory allocation interface in the updated link library based on the third call request; and a fourth determining module, configured to obtain a response of the first call request according to a calling result of the third call request.

Figure 3:
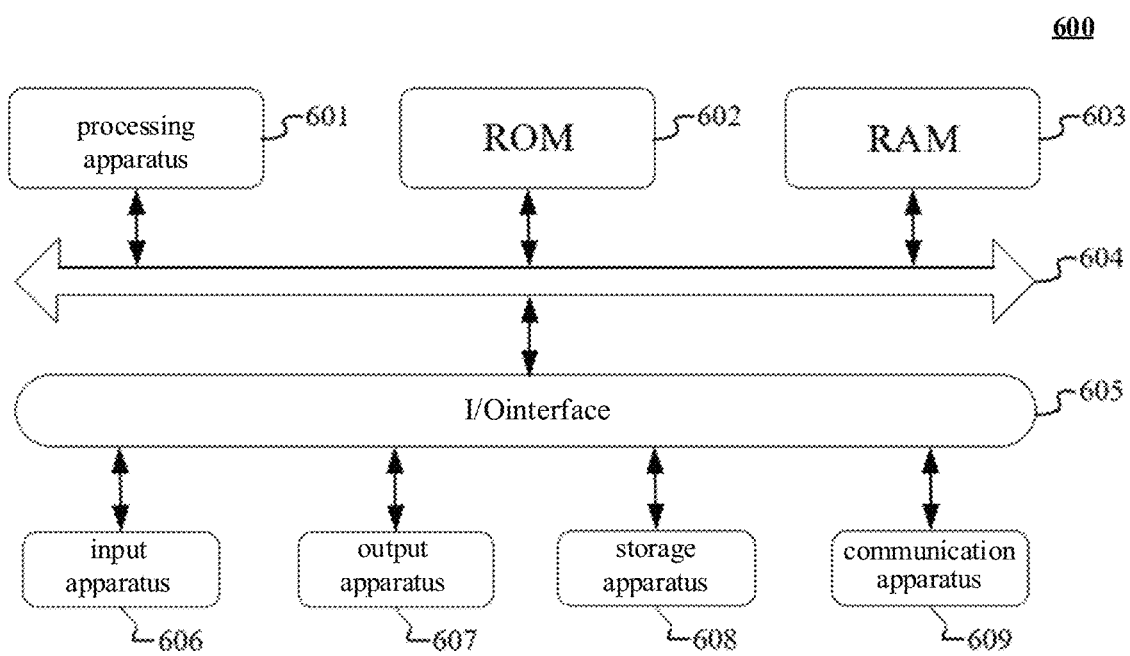
FIG. 3 illustrates a schematic diagram of a structure of an electronic device suitable for implementing embodiments of the present disclosure.

Refer to FIG. 3 below. FIG. 3 illustrates a schematic diagram of a structure of an electronic device 600 suitable for implementing embodiments of the present disclosure. The terminal device in embodiments of the present disclosure may include, but is not limited to: a mobile terminal such as a mobile phone, a laptop computer, a digital broadcast receiver, a personal digital assistant (Personal Digital Assistant, abbreviated as PDA), a tablet computer (tablet computer, abbreviated as PAD), a portable multimedia player (Portable Multimedia Player, abbreviated as PMP), a vehicle-mounted terminal (for example, a vehicle-mounted navigation terminal); and a fixed terminal such as a digital television (television, abbreviated as TV) or a desktop computer. The electronic device illustrated in FIG. 3 is just an example, and should not bring any limitation to functions and an application scope of embodiments of the present disclosure.

As illustrated in FIG. 3, the electronic device 600 may include a processing apparatus (for example, a central processing unit or a graphics processing unit) 601. The processing apparatus 601 may perform various appropriate actions and processes according to a program stored in a read-only memory (Read-Only Memory, abbreviated as ROM) 602 or a program loaded from a storage apparatus 608 into a random access memory (Random Access Memory, abbreviated as RAM) 603. In the RAM 603, various programs and data required for operations of the electronic device 600 are also stored. The processing apparatus 601, the ROM 602, and the RAM 603 are connected to each other through a bus 604. An input/output (Input/Output, abbreviated as I/O) interface 605 is also connected to the bus 604.

Generally, the following apparatuses may be connected to the I/O interface 605: an input apparatus 606 including, for example, a touch screen, a touch pad, a keyboard, a mouse, a camera, a microphone, an accelerometer, or a gyroscope and so on; an output apparatus 607 including, for example, a liquid crystal display (Liquid Crystal Display, abbreviated as LCD), a speaker, or a vibrator and so on; a storage apparatus 608 including, for example, a magnetic tape or a hard disk and so on; and a communication apparatus 609. The communication apparatus 609 may allow the electronic device 600 to perform wireless or wired communication with another apparatus to exchange data. Although FIG. 3 illustrates the electronic device 600 having various apparatuses, it should be understood that it is not required to implement or provide all the shown apparatuses. More or fewer apparatuses may alternatively be implemented or provided.

In particular, according to embodiments of the present disclosure, the process described above with reference to the flowchart may be implemented as a computer software program. For example, an embodiment of the present disclosure includes a computer program product including a computer program carried in a non-transitory computer-readable medium. The computer program includes program code for performing the methods shown in the flowcharts. In such an embodiment, the computer program may be downloaded and installed from a network through the communication apparatus 609, or installed from the storage apparatus 608, or installed from the ROM 602. When the computer program is executed by the processing apparatus 601, the above functions defined in the methods of embodiments of the present disclosure are performed.

It should be noted that the computer-readable medium mentioned in the present disclosure may be a computer-readable signal medium, a computer-readable storage medium, or any combination thereof. The computer-readable storage medium may be, for example, but is not limited to, an electrical, magnetic, optical, electromagnetic, infrared, or semiconductor system, apparatus, or device, or any combination thereof. A more specific example of computer-readable storage medium may include, but is not limited to: an electrical connection with one or more wires, a portable computer disk, a hard drive, a random access memory (RAM), a read-only memory (ROM), an erasable programmable read-only memory (Erasable Programmable Read-only Memory (abbreviated as EPROM) or a flash memory), a fiber optic, a compact disc read-only memory (Compact Disc Read-only Memory, abbreviated as CD-ROM), an optical storage device, a magnetic storage device, or any suitable combination of them. In the present disclosure, the computer-readable storage medium may be any tangible medium including or storing a program. The program may be used by an instruction execution system, apparatus, or device, or may be used in combination with an instruction execution system, apparatus, or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (abbreviated as RF) and the like, or any appropriate combination of them.

In some implementations, a client and a server may communicate based on any currently known or future developed network protocol, for example, the Hypertext Transfer Protocol (HyperText Transfer Protocol, abbreviated as HTTP) and so on, and may interconnect with digital data communication (for example, a communication network) in any form or medium. Examples of the communication networks include a local area network (Local Area Network, abbreviated as LAN), a wide area network (Wide Area Network, abbreviated as WAN), an internet (for example, the Internet), and a peer-to-peer network (for example, ad hoc end-to-end network), as well as any currently known or future developed network.

The above-mentioned computer-readable medium may be included in the electronic device; or may exist separately without being assembled into the electronic device.

The above-mentioned computer-readable medium carries one or more programs. When the above one or more programs are executed by the electronic device, the electronic device is enabled to: determine a usage capacity of a physical video memory in response to receiving a first call request of an application program for a video memory allocation interface in a target video memory management link library; if a sum of the usage capacity and an applied capacity corresponding to the first call request is greater than a total capacity of the physical video memory, generate a second call request for calling a memory hosting interface according to the first call request, and call the memory hosting interface based on the second call request; and obtain a response of the first call request based on a calling result of the second call request.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules involved in embodiments of the present disclosure may be implemented by software or hardware. A name of a module does not constitute a limitation on the module itself in some cases. For example, the first determining module may also be described as "a module configured to determine a usage capacity of a physical video memory in response to receiving a first call request of an application program for a video memory allocation interface in a target video memory management link library".

The functions described above herein may be at least partially performed by one or more hardware logic components. For example, without limitation, example types of hardware logic components that can be used include: a field programmable gate array (Field Programmable Gate Array, abbreviated as FPGA), an application specific integrated circuit (Application Specific Integrated Circuit, abbreviated as ASIC), an application specific standard product (Application Specific Standard Product, abbreviated as ASSP), a system on chip (System on Chip, abbreviated as SOC), a complex programmable logic device (Complex Programmable Logic Device, abbreviated as CPLD), and so on.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments in the present disclosure, Example 1 provides a video memory allocation method, wherein the method includes:

determining a usage capacity of a physical video memory in response to receiving a first call request of an application program for a video memory allocation interface in a target video memory management link library;

if a sum of the usage capacity and an applied capacity corresponding to the first call request is greater than a total capacity of the physical video memory, generating a second call request for calling a memory hosting interface according to the first call request, and calling the memory hosting interface based on the second call request; and obtaining a response of the first call request according to a calling result of the second call request.

According to one or more embodiments in the present disclosure Example 2 provides the method of Example 1, wherein the memory hosting interface is configured to dynamically apply for a memory to use the applied memory as a virtual video memory; and the calling the memory hosting interface based on the second call request includes:

obtaining a capacity of the virtual video memory being applied; and if the sum of the capacity of the virtual video memory being applied and the applied capacity is less than a target threshold, performing memory allocation based on the memory hosting interface and the applied capacity, wherein the target threshold is determined based on the total capacity of the physical video memory and a preset ratio, and the preset ratio is greater than 0 and less than 1.

According to one or more embodiments in the present disclosure, Example 3 provides the method of Example 2, wherein the method includes:

if a sum of a capacity of the memory being applied (namely, the capacity of the virtual video memory being applied) and the applied capacity is not less than the target threshold, determining that the calling result of the second call request is the video memory being not allocated; and outputting a prompt message, wherein the prompt message is used for prompting insufficient video memory allocation.

According to one or more embodiments in the present disclosure, Example 4 provides the method of Example 1, wherein the target video memory management link library performs linking in the following manners:

renaming an initial name of a native video memory management link library in a video memory operation platform to obtain an updated link library; and naming a name of the target video memory management link library as the initial name of the native video memory management link library, and connecting the target video memory management link library to the video memory operation platform and a link address corresponding to the native video memory management link library, wherein the target video memory management link library and the updated link library have one-to-one corresponding interfaces with the same name, implementation of the video memory allocation interface in the target video memory management link library is different from implementation of a video memory allocation interface in the updated link library, and implementation of an interface in the target video memory management link library other than the video memory allocation interface is calling for a corresponding interface with the same name in the updated link library.

According to one or more embodiments in the present disclosure, Example 5 provides the method of Example 4, wherein the video memory allocation method is applied to a container, and the target video memory management link library is mounted in the container in the following manners:

storing the target video memory management link library and the updated link library at a target storage location of a host corresponding to the container; and upon the container being started, linking the target video memory management link library to a link address of a native video memory management link library corresponding to the container, and linking the updated link library to a target address in the container, wherein the target address is different from the link address.

According to one or more embodiments in the present disclosure, Example 6 provides the method of Example 4, wherein the method includes:

if the sum of the usage capacity and the applied capacity corresponding to the first call request is not greater than the total capacity of the physical video memory, generating a third call request for calling the video memory allocation interface in the updated link library according to the first call request, and calling the video memory allocation interface in the updated link library based on the third call request; and obtaining the response of the first call request according to a calling result of the third call request.

According to one or more embodiments in the present disclosure, Example 7 provides a video memory allocation apparatus, wherein the apparatus includes:

a first determining module, configured to determine a usage capacity of a physical video memory in response to receiving a first call request of an application program for a video memory allocation interface in a target video memory management link library;

a generation module, configured to: if a sum of the usage capacity and an applied capacity corresponding to the first call request is greater than a total capacity of the physical video memory, generate a second call request for calling a memory hosting interface according to the first call request, and calling the memory hosting interface based on the second call request; and a second determining module, configured to obtain a response of the first call request according to a calling result of the second call request.

According to one or more embodiments in the present disclosure, Example 8 provides the apparatus of Example 7, wherein the target video memory management link library performs linking in the following manners:

renaming an initial name of a native video memory management link library in a video memory operation platform to obtain an updated link library; and naming a name of the target video memory management link library as the initial name of the native video memory management link library, and connecting the target video memory management link library to the video memory operation platform and a link address corresponding to the native video memory management link library, wherein the target video memory management link library and the updated link library have one-to-one corresponding interfaces with the same name, implementation of the video memory allocation interface in the target video memory management link library is different from implementation of a video memory allocation interface in the updated link library, and implementation of an interface in the target video memory management link library other than the video memory allocation interface is calling for a corresponding interface with the same name in the updated link library.

According to one or more embodiments in the present disclosure, Example 9 provides a computer-readable medium storing a computer program thereon. The steps of the method of any one of Example 1 to Example 6 are implemented when the program is executed by a processing apparatus.

According to one or more embodiments in the present disclosure, Example 10 provides an electronic device, including:

a storage apparatus storing at least one computer program thereon; and at least one processing apparatus, configured to execute the at least one computer program in the storage apparatus to implement the steps of the method of any one of Example 1 to Example 6.

According to one or more embodiments in the present disclosure, Example 11 provides a computer program. The computer program includes program code executable by a processing apparatus, and when the processing apparatus executes the computer program, the steps of the method according to any one of Example 1 to Example 6 are implemented.

According to one or more embodiments in the present disclosure, Example 12 provides a computer program product. The computer program product includes a computer program carried on a non-transitory computer-readable medium, the computer program includes program code executable by a processing apparatus, and when the processing apparatus executes the computer program, the steps of the method according to any one of Example 1 to Example 6 are implemented.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The inventio claimed is:

1. A video memory allocation method, comprising:
   determining a usage capacity of a physical video memory in response to receiving a first call request of an application program for a video memory allocation interface in a target video memory management link library;
   if a sum of the usage capacity and an applied capacity corresponding to the first call request is greater than a total capacity of the physical video memory, generating a second call request for calling a memory hosting interface according to the first call request, and calling the memory hosting interface based on the second call request; and
   obtaining a response of the first call request according to a calling result of the second call request.

2. The method according to claim 1, wherein the memory hosting interface is configured to dynamically apply for a memory to use applied memory as a virtual video memory; and the calling the memory hosting interface based on the second call request comprises:
   obtaining a capacity of the virtual video memory being applied; and
   if a sum of the capacity of the virtual video memory being applied and the applied capacity is less than a target threshold, performing memory allocation based on the memory hosting interface and the applied capacity, wherein the target threshold is determined based on the total capacity of the physical video memory and a preset ratio, and the preset ratio is greater than 0 and less than 1.

3. The method according to claim 2, wherein the method further comprises:
   if the sum of the capacity of the virtual video memory being applied and the applied capacity is not less than the target threshold, determining that the calling result of the second call request is the video memory being not allocated; and outputting a prompt message, wherein the prompt message is used for prompting insufficient video memory allocation.

4. The method according to claim 3, wherein the target video memory management link library performs linking in the following manners:
   renaming an initial name of a native video memory management link library in a video memory operation platform to obtain an updated link library; and
   naming a name of the target video memory management link library as the initial name of the native video memory management link library, and connecting the target video memory management link library to the video memory operation platform and a link address corresponding to the native video memory management link library, wherein the target video memory management link library and the updated link library have one-to-one corresponding interfaces with the same name, implementation of the video memory allocation interface in the target video memory management link library is different from implementation of a video memory allocation interface in the updated link library, and implementation of an interface in the target video memory management link library other than the video memory allocation interface is calling for a corresponding interface with the same name in the updated link library.

5. The method according to claim 2, wherein the target video memory management link library performs linking in the following manners:
   renaming an initial name of a native video memory management link library in a video memory operation platform to obtain an updated link library; and
   naming a name of the target video memory management link library as the initial name of the native video memory management link library, and connecting the target video memory management link library to the video memory operation platform and a link address corresponding to the native video memory management link library, wherein the target video memory management link library and the updated link library have one-to-one corresponding interfaces with the same name, implementation of the video memory allocation interface in the target video memory management link library is different from implementation of a video memory allocation interface in the updated link library, and implementation of an interface in the target video memory management link library other than the video memory allocation interface is calling for a corresponding interface with the same name in the updated link library.

6. The method according to claim 1, wherein the target video memory management link library performs linking in the following manners:
   renaming an initial name of a native video memory management link library in a video memory operation platform to obtain an updated link library; and
   naming a name of the target video memory management link library as the initial name of the native video memory management link library, and connecting the target video memory management link library to the video memory operation platform and a link address corresponding to the native video memory management link library, wherein the target video memory management link library and the updated link library have one-to-one corresponding interfaces with the same name, implementation of the video memory allocation interface in the target video memory management link library is different from implementation of a video memory allocation interface in the updated link library, and implementation of an interface in the target video memory management link library other than the video memory allocation interface is calling for a corresponding interface with the same name in the updated link library.

7. The method according to claim 6, wherein the video memory allocation method is applied to a container, and the target video memory management link library is mounted in the container in the following manners:
   storing the target video memory management link library and the updated link library at a target storage location of a host corresponding to the container; and
   upon the container being started, linking the target video memory management link library to a link address of a native video memory management link library corresponding to the container, and linking the updated link library to a target address in the container, wherein the target address is different from the link address.

8. The method according to claim 6, further comprising:
   if the sum of the usage capacity and the applied capacity corresponding to the first call request is not greater than the total capacity of the physical video memory, generating a third call request for calling the video memory allocation interface in the updated link library according to the first call request, and calling the video memory allocation interface in the updated link library based on the third call request; and
   obtaining the response of the first call request according to a calling result of the third call request.

9. A non-transient computer-readable storage medium, wherein the non-transient computer-readable storage medium stores a computer program thereon, a video memory allocation method is implemented when the computer program is executed by a processing apparatus, and the method comprises:
   determining a usage capacity of a physical video memory in response to receiving a first call request of an application program for a video memory allocation interface in a target video memory management link library;
   if a sum of the usage capacity and an applied capacity corresponding to the first call request is greater than a total capacity of the physical video memory, generating a second call request for calling a memory hosting interface according to the first call request, and calling the memory hosting interface based on the second call request; and
   obtaining a response of the first call request according to a calling result of the second call request.

10. The non-transient computer-readable storage medium according to claim 9, wherein the memory hosting interface is configured to dynamically apply for a memory to use applied memory as a virtual video memory; and the calling the memory hosting interface based on the second call request comprises:
   obtaining a capacity of the virtual video memory being applied; and
   if a sum of the capacity of the virtual video memory being applied and the applied capacity is less than a target threshold, performing memory allocation based on the memory hosting interface and the applied capacity, wherein the target threshold is determined based on the total capacity of the physical video memory and a preset ratio, and the preset ratio is greater than 0 and less than 1.

11. The non-transient computer-readable storage medium according to claim 10, wherein the method further comprises:
if the sum of the capacity of the virtual video memory being applied and the applied capacity is not less than the target threshold, determining that the calling result of the second call request is the video memory being not allocated; and
outputting a prompt message, wherein the prompt message is used for prompting insufficient video memory allocation.

12. The non-transient computer-readable storage medium according to claim 9, wherein the target video memory management link library performs linking in the following manners:
renaming an initial name of a native video memory management link library in a video memory operation platform to obtain an updated link library; and
naming a name of the target video memory management link library as the initial name of the native video memory management link library, and connecting the target video memory management link library to the video memory operation platform and a link address corresponding to the native video memory management link library, wherein the target video memory management link library and the updated link library have one-to-one corresponding interfaces with the same name, implementation of the video memory allocation interface in the target video memory management link library is different from implementation of a video memory allocation interface in the updated link library, and implementation of an interface in the target video memory management link library other than the video memory allocation interface is calling for a corresponding interface with the same name in the updated link library.

13. The non-transient computer-readable storage medium according to claim 12, wherein the video memory allocation method is applied to a container, and the target video memory management link library is mounted in the container in the following manners:
storing the target video memory management link library and the updated link library at a target storage location of a host corresponding to the container; and
upon the container being started, linking the target video memory management link library to a link address of a native video memory management link library corresponding to the container, and linking the updated link library to a target address in the container, wherein the target address is different from the link address.

14. The non-transient computer-readable storage medium according to claim 12, wherein the method further comprises:
if the sum of the usage capacity and the applied capacity corresponding to the first call request is not greater than the total capacity of the physical video memory, generating a third call request for calling the video memory allocation interface in the updated link library according to the first call request, and calling the video memory allocation interface in the updated link library based on the third call request; and
obtaining the response of the first call request according to a calling result of the third call request.

15. An electronic device, comprising:
at least one storage apparatus storing at least one computer program thereon; and
at least one processing apparatus, configured to execute the at least one computer program in the at least one storage apparatus to implement a video memory allocation method, the method comprising:
determining a usage capacity of a physical video memory in response to receiving a first call request of an application program for a video memory allocation interface in a target video memory management link library;
if a sum of the usage capacity and an applied capacity corresponding to the first call request is greater than a total capacity of the physical video memory, generating a second call request for calling a memory hosting interface according to the first call request, and calling the memory hosting interface based on the second call request; and
obtaining a response of the first call request according to a calling result of the second call request.

16. The electronic device according to claim 15, wherein the memory hosting interface is configured to dynamically apply for a memory to use applied memory as a virtual video memory; and the calling the memory hosting interface based on the second call request comprises:
obtaining a capacity of the virtual video memory being applied; and
if a sum of the capacity of the virtual video memory being applied and the applied capacity is less than a target threshold, performing memory allocation based on the memory hosting interface and the applied capacity, wherein the target threshold is determined based on the total capacity of the physical video memory and a preset ratio, and the preset ratio is greater than 0 and less than 1.

17. The electronic device according to claim 16, wherein the method further comprises:
if the sum of the capacity of the virtual video memory being applied and the applied capacity is not less than the target threshold, determining that the calling result of the second call request is the video memory being not allocated; and
outputting a prompt message, wherein the prompt message is used for prompting insufficient video memory allocation.

18. The electronic device according to claim 15, wherein the target video memory management link library performs linking in the following manners:
renaming an initial name of a native video memory management link library in a video memory operation platform to obtain an updated link library; and
naming a name of the target video memory management link library as the initial name of the native video memory management link library, and connecting the target video memory management link library to the video memory operation platform and a link address corresponding to the native video memory management link library, wherein the target video memory management link library and the updated link library have one-to-one corresponding interfaces with the same name, implementation of the video memory allocation interface in the target video memory management link library is different from implementation of a video memory allocation interface in the updated link library, and implementation of an interface in the target video memory management link library other than the video memory allocation interface is calling for a corresponding interface with the same name in the updated link library.

19. The electronic device according to claim 18, wherein the video memory allocation method is applied to a container, and the target video memory management link library is mounted in the container in the following manners:

storing the target video memory management link library and the updated link library at a target storage location of a host corresponding to the container; and upon the container being started, linking the target video memory management link library to a link address of a native video memory management link library corresponding to the container, and linking the updated link library to a target address in the container, wherein the target address is different from the link address.

20. The electronic device according to claim 18, wherein the method further comprises:

if the sum of the usage capacity and the applied capacity corresponding to the first call request is not greater than the total capacity of the physical video memory, generating a third call request for calling the video memory allocation interface in the updated link library according to the first call request, and calling the video memory allocation interface in the updated link library based on the third call request; and obtaining the response of the first call request according to a calling result of the third call request.

* * * * *